(12) United States Patent
Martin

(10) Patent No.: US 8,189,798 B2
(45) Date of Patent: May 29, 2012

(54) METHOD AND SYSTEM FOR CONTROLLING A MAXIMUM SIGNAL LEVEL OUTPUT TO HEADPHONES COUPLED TO A WIRELESS DEVICE

(75) Inventor: Cyril Martin, Bochum (DE)

(73) Assignee: Research In Motion Limited, Waterloo (CA)

( * ) Notice: Subject to any disclaimer, the term of this patent is extended or adjusted under 35 U.S.C. 154(b) by 594 days.

(21) Appl. No.: 12/394,218

(22) Filed: Feb. 27, 2009

(65) Prior Publication Data

US 2010/0220865 A1    Sep. 2, 2010

(51) Int. Cl.
    *H04R 29/00* (2006.01)
(52) U.S. Cl. .............. 381/59; 381/57; 381/58; 381/384; 381/120; 381/104; 381/105; 381/106; 381/107; 381/108; 381/109; 455/556.1; 455/569.2; 455/456.4; 455/456.1
(58) Field of Classification Search .............. 381/59, 381/57, 58, 384, 120, 104, 105, 106, 107, 381/108, 109; 455/42.4, 569.2, 456.4, 1, 455/456.1, 565, 556.1
See application file for complete search history.

(56) References Cited

U.S. PATENT DOCUMENTS

| | | | |
|---|---|---|---|
| 5,450,624 A | 9/1995 | Porambo et al. | |
| 5,783,926 A | 7/1998 | Moon et al. | |
| 6,064,742 A | 5/2000 | Landelius | |
| 6,359,987 B1 | 3/2002 | Tran et al. | |
| 6,696,846 B1 | 2/2004 | Shieh et al. | |
| 7,099,481 B2 | 8/2006 | Baker et al. | |
| 7,130,184 B2 | 10/2006 | Choi | |
| 7,259,618 B2* | 8/2007 | Hand et al. | 330/10 |
| 7,263,367 B1* | 8/2007 | Sabot | 455/456.1 |
| 2004/0081099 A1 | 4/2004 | Patterson et al. | |
| 2005/0053243 A1 | 3/2005 | Ganton | |
| 2005/0201568 A1 | 9/2005 | Goyal | |
| 2006/0099967 A1* | 5/2006 | Colvin et al. | 455/456.4 |
| 2006/0142062 A1 | 6/2006 | Eder et al. | |
| 2006/0182294 A1 | 8/2006 | Grasbon et al. | |
| 2007/0092090 A1 | 4/2007 | Oddodart et al. | |
| 2007/0098190 A1 | 5/2007 | Song et al. | |
| 2007/0183605 A1* | 8/2007 | Yoshino et al. | 381/59 |
| 2010/0120366 A1* | 5/2010 | DeBiasio et al. | 455/41.3 |

FOREIGN PATENT DOCUMENTS

DE    10 2007 032 281 A1    1/2009

(Continued)

OTHER PUBLICATIONS

British/European Standard EN 50332-1:2000, "Sound System Equipment: Headphones and Earphones Associated with Portable Audio Equipment—Maximum Sound Pressure Level Measurement Methodology and Limit Considerations", Mar. 2000.

(Continued)

*Primary Examiner* — A O Williams
(74) *Attorney, Agent, or Firm* — Novak Druce + Quigg LLP

(57) ABSTRACT

A method for controlling a maximum signal level output to headphones of a wireless device is provided. The method includes: determining an impedance of the headphones; determining a carrier specific maximum signal level for headphones having the impedance; and, adjusting an audio amplifier of the wireless device coupled to the headphones to restrict the maximum signal level output to the headphones to the carrier specific maximum signal level.

18 Claims, 6 Drawing Sheets

FOREIGN PATENT DOCUMENTS

| | | | |
|---|---|---|---|
| EP | 1 720 375 A1 | | 11/2006 |
| JP | 2006-279247 | * | 10/2006 |
| JP | 2009-253926 | * | 10/2009 |
| WO | 2008/128563 A1 | | 10/2008 |

OTHER PUBLICATIONS

British/European Standard EN 50332-2:2003, "Sound System Equipment: Headphones and Earphones Associated with Portable Audio Equipment—Maximum Sound Pressure Level Measurement Methodology and Limit Considerations", Oct. 2003.

Summons to attend oral proceedings pursuant to Rule 115(1) EPC for related European Application No. 09154033.6 dated Jun. 29, 2010.

Extended European Search Report dated Nov. 28, 2011. In corresponding application No. 11176831.3.

Search Report mailed Apr. 17, 2012. In corresponding application No. 11195765.0.

* cited by examiner

400

METHOD AND SYSTEM FOR CONTROLLING A MAXIMUM SIGNAL LEVEL OUTPUT TO HEADPHONES COUPLED TO A WIRELESS DEVICE

FIELD OF THE APPLICATION

This application relates to the field of wireless devices, and more specifically, to a method and system for controlling a maximum signal level output to headphones coupled to a wireless device.

BACKGROUND

Current wireless mobile communication devices include microprocessors, memory, soundcards, speakers, headphones, and run one or more software applications in addition to providing for voice communications. Examples of software applications used in these wireless devices include micro-browsers, address books, email clients, instant messaging ("IM") clients, and wavetable instruments. Additionally, wireless devices have access to a plurality of services via the Internet. A wireless device may, for example, be used to browse web sites on the Internet, to transmit and receive graphics, and to execute streaming audio and/or video applications. Such wireless devices may operate on a cellular network, on a wireless local area network ("WLAN"), or on both of these types of networks.

One problem with current wireless devices pertains to the adjustment of maximum output sound pressure levels for headphones coupled to such devices. Headphones are typically used to listen to voice calls, radio programs, audio programs (e.g., music), etc., stored on or accessed by the wireless device. In particular, the maximum output sound pressure level for headphones for wireless devices and hand-held products is legally constrained in several jurisdictions in order to protect users from hearing loss. For example, European Standard EN 50332-1:2000, dated March 2000 and entitled "Sound System Equipment: Headphones And Earphones Associated With Portable Audio Equipment—Maximum Sound Pressure Level Measurement Methodology And Limit Considerations—Part 1: General Method For 'One Package Equipment'", and which is incorporated herein by reference, restricts maximum sound pressure level at the headphones (i.e., for headphones provided with the portable audio equipment and from the same manufacturer) to 100 dB. In addition, European Standard EN 50332-2:2003, dated October 2003 and entitled "Sound System Equipment: Headphones And Earphones Associated With Portable Audio Equipment—Maximum Sound Pressure Level Measurement Methodology And Limit Considerations—Part 2: Matching Of Sets With Headphones If Either Or Both Are Offered Separately", and which is incorporated herein by reference, restricts maximum sound pressure level at the headphones (i.e., for headphones provided separately from the portable audio equipment by a different manufacturer) to 94 dB. Measurement of maximum sound pressure levels according to these standards is specified with respect to headphones having an impedance of 32 Ohms. One problem relating to such standards is that in order to set the output signal level (e.g., in mV RMS) appropriately at the output jack of the wireless device in order to meet the maximum sound pressure level specified, the impedance of the headphones must be known. This is especially problematic if the headphones are not provided by the manufacturer as a package with the wireless device.

A need therefore exists for an improved method and system for controlling a maximum signal level output to headphones coupled to a wireless device. Accordingly, a solution that addresses, at least in part, the above and other shortcomings is desired.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the application. In some instances, certain software, circuits, structures and techniques have not been described or shown in detail in order not to obscure the application. Embodiments of the present application may be implemented in any computer programming language provided that the operating system of the wireless device or data processing system provides the facilities that may support the requirements of the application. Any limitations presented would be a result of a particular type of operating system or computer programming language and would not be a limitation of the present application. Embodiments of the preset application may also be implemented in hardware or in a combination of hardware and software.

According to one embodiment of the application, there is provided a method for controlling a maximum signal level output to headphones of a wireless device. The method includes: determining an impedance of the headphones; determining a carrier specific maximum signal level for headphones having the impedance; and, adjusting an audio amplifier of the wireless device coupled to the headphones to restrict the maximum signal level output to the headphones to the carrier specific maximum signal level.

Figure 1:
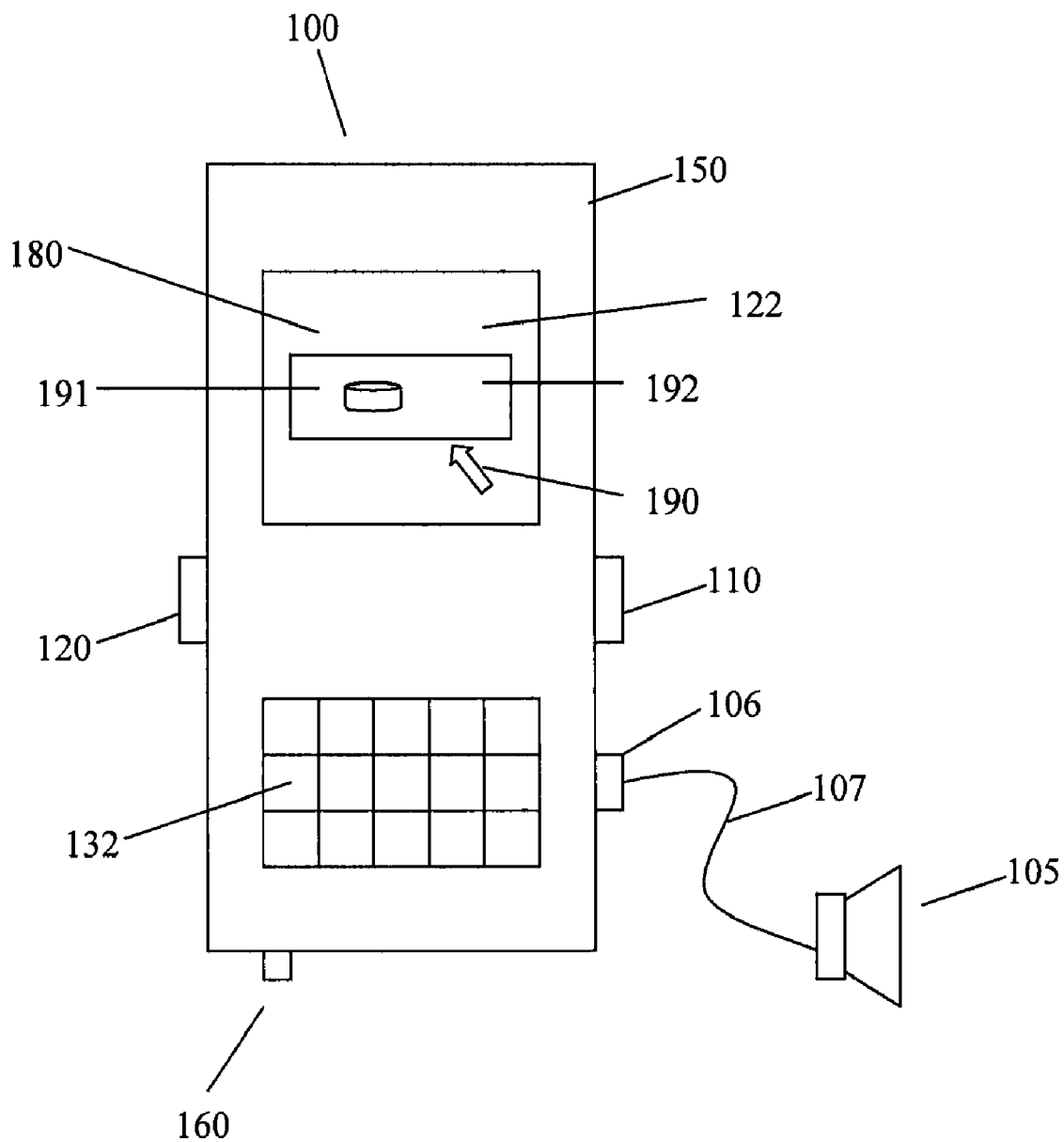
FIG. 1 is a front view illustrating a wireless device coupled to headphones and adapted for implementing an embodiment of the application.

FIG. 1 is a front view illustrating a wireless device 100 coupled to headphones 105 (a.k.a., headphone set, headphone, headset, earphone, earphones, etc.) and adapted for implementing an embodiment of the application. The wireless device 100 includes a casing 150, a display screen 122, a graphical user interface ("GUI") 180 displayed on the display screen 122, a keyboard (or keypad) 132, a trackball (or thumbwheel) 110, various select buttons 120, various inputs/outputs (e.g., power connector jack, data interface ports, etc.)

160, and a headphones jack 106. Internally, the wireless device 100 includes one or more circuit boards (not shown), a CPU 138, memory 124, 126, 200, a battery 156, an antenna (not shown), etc., which are operatively coupled to the various inputs/outputs 160, the keyboard 132, the display screen 122, the headphones jack 106, etc., as will be described below.

The headphones 105 are coupled to the wireless device 100 by a headphones cable or lead 107 which is inserted into the headphones jack 106. The headphones 105 include a speaker assembly which is inserted into or placed over a user's ear. According to one embodiment, the headphones 105 include two speaker assemblies, one for each of the user's ears. Each speaker assembly includes a speaker having an impedance (referred to as the impedance of the headphones in the following). The headphones 105, headphones jack 106, and headphones cable 107 may be configured for stereo and/or mono operation. When the headphones cable 107 is inserted into the headphones jack 106, audio output signals may be switched from the internal speaker 134 (see FIG. 2) to the headphones 105. Control of audio signal level (e.g., in mV RMS) output to the headphones 105 is performed by a headphones subsystem 400 as described below. According to one embodiment, the headphones jack 106 is a 3.5 mm headset jack adapted to support both a stereo headphones output and a mono microphone input.

Figure 2:
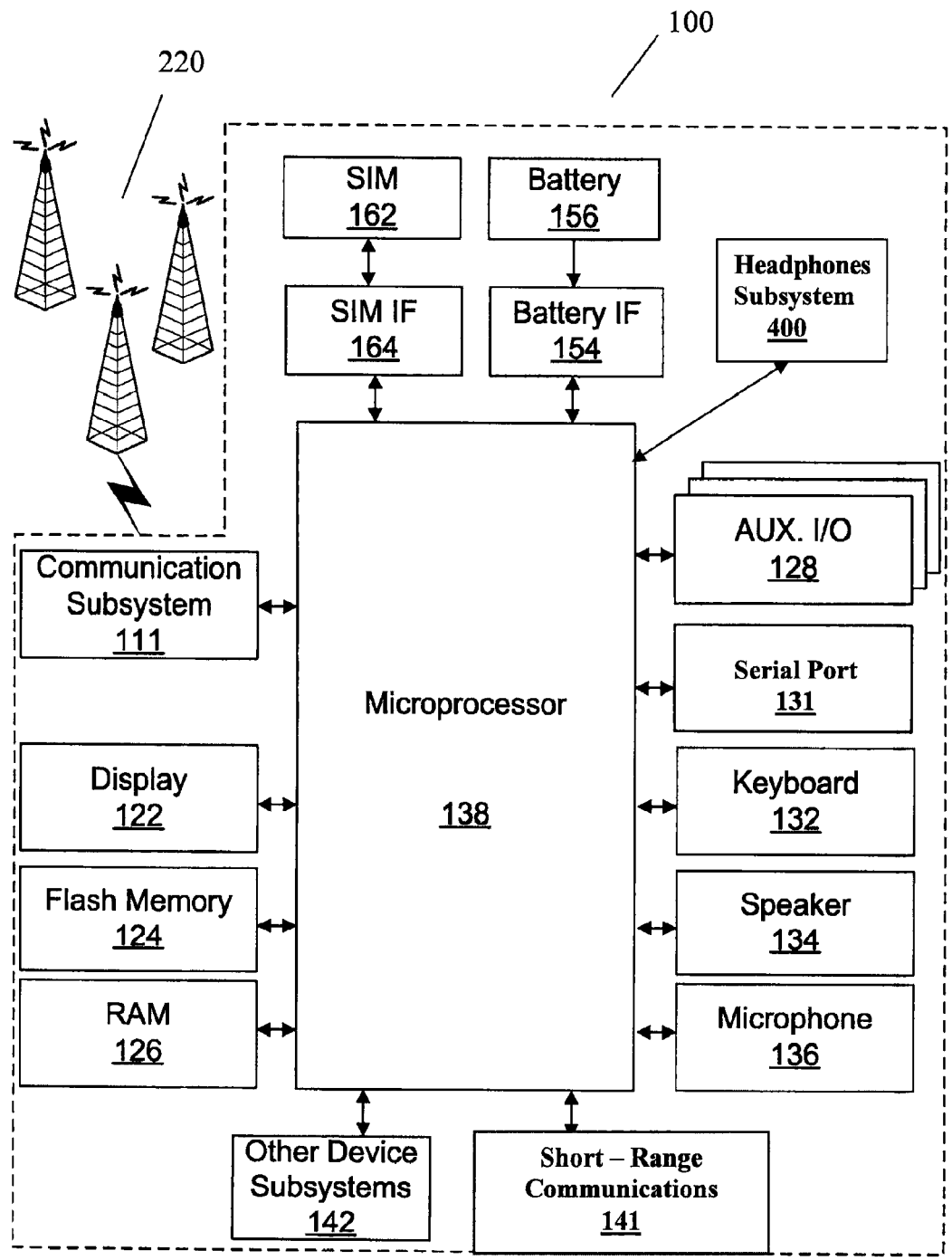
FIG. 2 is a block diagram illustrating the wireless device of FIG. 1 and a wireless network adapted for implementing an embodiment of the application.

FIG. 2 is a block diagram illustrating the wireless device 100 of FIG. 1 and a wireless network 220 adapted for implementing an embodiment of the application. The wireless network 220 may include antenna, base stations, access points, transceivers, supporting radio equipment, etc., as known to those of ordinary skill in the art, for supporting wireless communications between the wireless device 100 and other devices (not shown).

The wireless device 100 may be a two-way communication device having at least voice and advanced data communication capabilities, including the capability to communicate with other devices. Depending on the functionality provided by the device 100, it may be referred to as a data messaging device, a two-way pager, a cellular telephone with data messaging capabilities, a wireless Internet appliance, a data communication device (with or without telephony capabilities), a Wi-Fi device, a WLAN device, a dual-mode (i.e., Wi-Fi and cellular) device, or a portable audio device.

The wireless device 100 has a communication subsystem 111, which includes a RF receiver, a RF transmitter, and associated components. As will be apparent to those skilled in the field of communications, the particular design of the communication subsystem 111 depends on the communication network 220 in which the device 100 is intended to operate.

The device 100 may be capable of cellular network access and hence the device 100 may have a subscriber identity module (or "SIM" card) 162 for inserting into a SIM interface ("IF") 164 in order to operate on the cellular network (e.g., a global system for mobile communication ("GSM") network).

The device 100 may be a battery-powered device and so it may also include a battery IF 154 for receiving one or more rechargeable batteries 156. The battery (or batteries) 156 provides electrical power to most if not all electrical circuitry in the device 100, and the battery IF 154 provides for a mechanical and electrical connection for it.

The wireless device 100 includes a microprocessor 138, also called a processor, which controls overall operation of the device 100. The microprocessor 138 interacts with device subsystems such as the display 122, a flash memory 124 or other persistent store, a random access memory ("RAM") 126, auxiliary input/output ("I/O") subsystems 128, a serial port (e.g., a universal serial bus ("USB") port) 131, the keyboard 132, the trackball or thumbwheel 110, the headphones 105, an internal speaker 134, a microphone 136, a short-range communications subsystem 141, and other device subsystems 142. The microprocessor 138, in addition to performing operating system functions, preferably enables execution of software applications on the device 100.

Figure 3:
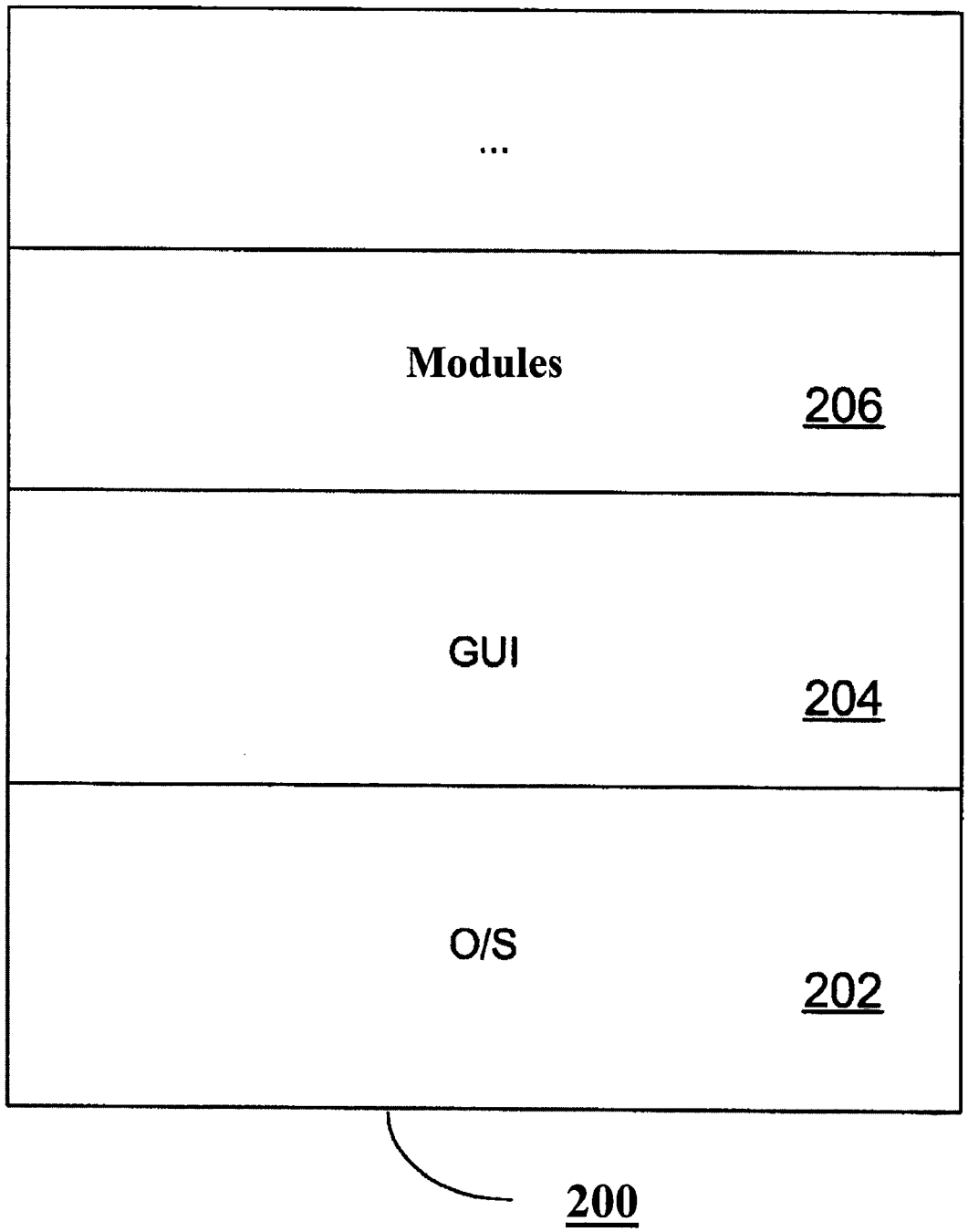
FIG. 3 is a block diagram illustrating a memory of the wireless device of FIGS. 1 and 2.

FIG. 3 is a block diagram illustrating a memory 200 of the wireless device 100 of FIGS. 1 and 2. The microprocessor 138 is coupled to the memory 200. The memory 200 has various hardware and software components for storing information (e.g., instructions, data, database tables, test parameters, etc.) for enabling operation of the device 100 and may include flash memory 124, RAM 126, ROM (not shown), disk drives (not shown), etc. In general, the memory 200 may include a variety of storage devices typically arranged in a hierarchy of storage as understood to those skilled in the art.

Operating system ("O/S") software modules 202 used by the microprocessor 138 may be stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

To provide a user-friendly environment to control the operation of the device 100, operating system ("O/S") software modules 202 resident on the device 100 provide a basic set of operations for supporting various applications typically operable through the GUI 180 and supporting GUI software modules 204. For example, the O/S 202 provides basic input/output system features to obtain input from the auxiliary I/O 128, the keyboard 132, the trackball or thumbwheel 110, and the like, and for facilitating output to the user through the display 122, the speaker 134, the headphones 105, etc. According to one embodiment, the wireless device 100 is provided with hardware and/or software modules 206 for facilitating and implementing the method of the application as will be described below.

A user may interact with the wireless device 100 and its various software modules 202, 204, 206, using the GUI 180. GUIs are supported by common operating systems and provide a display format which enables a user to choose commands, execute application programs, manage computer files, and perform other functions by selecting pictorial representations known as icons, or items from a menu through use of an input or pointing device such as a trackball or thumbwheel 110 and keyboard 132. The GUI 180 may include a cursor 190, various selectable objects and icons 191, and various windows 192.

Thus, the wireless device 100 includes computer executable programmed instructions for directing the device 100 to implement the embodiments of the present application. The programmed instructions may be embodied in one or more hardware or software modules 206 which may be resident in the memory 200 of the wireless device 100. Alternatively, the programmed instructions may be embodied on a computer readable medium (such as a CD disk or floppy disk) which may be used for transporting the programmed instructions to the memory of the wireless device 100. Alternatively, the programmed instructions may be embedded in a computer-readable signal or signal-bearing medium that may be uploaded to a network 220 by a vendor or supplier of the programmed instructions, and this signal or signal-bearing medium may be downloaded through an interface 111, 131, 141 to the wireless device 100 from the network 220 by end users or potential buyers.

Figure 4:
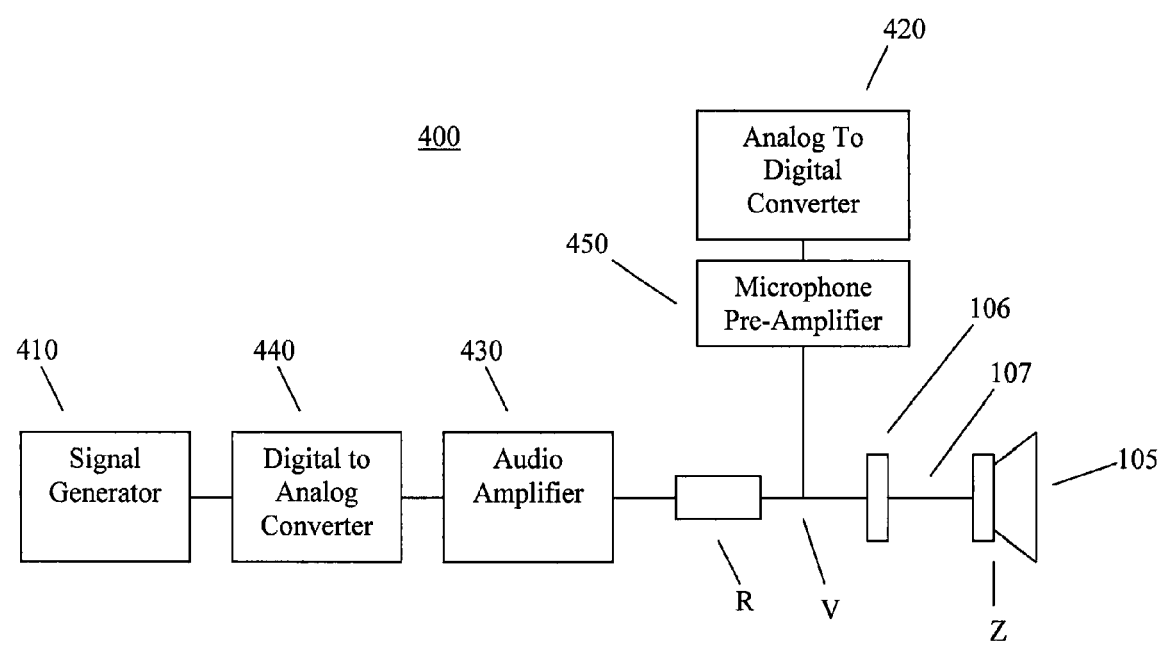
FIG. 4 is a block diagram illustrating a headphones subsystem in accordance with an embodiment of the application.

FIG. 4 is a block diagram illustrating a headphones subsystem 400 in accordance with an embodiment of the application. Components of the headphones subsystem 400 are generally contained in the wireless device 100 and are used to determine the impedance of the headphones 105 in order to adjust the maximum signal level (e.g., in mV RMS) output to the headphones 105 (and hence the maximum sound pressure level output by the headphones 105).

According to one embodiment, the headphones system 400 includes a signal generator 410, a digital to analog converter ("DAC") 440, and an audio amplifier 430 for generating an inaudible high frequency signal (e.g., 25 kHz). The signal generator 410, DAC 440, and audio amplifier 430 are controlled by the microprocessor 138. The audio amplifier 430 is coupled to the headphones 105 through a series resistor R. The series resistor R may have a low value (e.g., 5 Ohms). A voltage V produced across the resistor R when the high frequency signal is applied to the resistor R and headphones 105 is indicative of the impedance Z of the headphones 105. The signal may be applied to the resistor R and headphones 105 whenever the headphones 105 are connected to the headphones jack 106 via the headphones cable 107. The voltage V is amplified by a microphone pre-amplifier 450 which is coupled to an analog to digital converter ("ADC") 420. The ADC 420 monitors the voltage V and provides a digital signal indicative of the voltage V and hence the impedance Z of the headphones 105 to the microprocessor 138. The ADC 420 may also be used by the microphone 136 of the wireless device 100 in order to reduce component count. The microprocessor 138 receives the digital signal from the ADC 420 and determines the impedance Z of the headphones 105 from it (e.g., by voltage divider principles, etc.). The microprocessor 138 may do this by accessing a table that stores voltage values (or digital signal values) and corresponding headphones impedance values.

Having determined the impedance Z for the headphones 105, the microprocessor 138 controls the audio amplifier 430 to restrict the maximum signal level (e.g., in mV RMS) output to the headphones 105. In this way, the sound pressure level output by the headphones 105 may be restricted to a maximum sound pressure level for the determined impedance Z. The microprocessor 138 may do this by accessing a table (e.g., included in or associated with modules 206) that stores headphones impedance values, corresponding maximum signal level values for the audio amplifier 430, and/or corresponding maximum sound pressure values for the headphones 105. For example, for a headphones impedance value of approximately 32 Ohms, the table 206 may indicate that the maximum sound pressure level for the headphones 105 is 100 dB.

According to one embodiment, if a headphone impedance value corresponding to the determined headphone impedance Z is not listed in the table 206, no maximum signal level for the audio amplifier 430 and no maximum sound pressure level for the headphones 105 is prescribed and hence the maximum signal level of the audio amplifier 430 and the maximum sound pressure level for the headphones 105 are not restricted for that value of determined headphones impedance Z.

Now, the maximum signal level (e.g., in mV RMS) and/or the maximum sound pressure level (e.g., in dB) for a given headphones impedance may be set by government regulation which may change depending on the carrier or the location in which the wireless device 100 is operating or is sold. As is known to those skilled in the art, the wireless device 100 has means for determining its carrier and/or location and hence the government regulations that may apply to set maximum signal levels and/or maximum sound pressure levels. Thus, according to one embodiment, the microprocessor 138 receives a signal indicative of the carrier and/or location of the wireless device 100 and determines whether a maximum signal level value and/or a maximum sound pressure level value has been prescribed for the carrier and/or location and for the determined headphones impedance Z. The microprocessor 138 may do this by accessing a table 206 that stores wireless device location, corresponding headphones impedance values, corresponding carrier (or location) specific maximum signal level values (if any) for the audio amplifier 430, and/or corresponding carrier (or location) specific maximum sound pressure level values (if any) for the headphones 105. For example, the table may indicate that if the wireless device 100 is associated with a carrier based in Great Britain and if the headphones impedance is 32 Ohms (i.e., +/−20%), then the maximum sound pressure level should be restricted to 100 dB (i.e., if the headphones 105 and wireless device 100 are sold as a package). As another example, the table 206 may indicate that if the wireless device 100 is associated with a carrier based in Great Britain and if the headphones impedance is 32 Ohms (i.e., +/−20%), then the maximum sound pressure level should be restricted to 94 dB (i.e., if the headphones 105 and wireless device 100 are not sold as a package).

Similarly, the maximum signal level (e.g., in mV RMS) and/or the maximum sound pressure level (e.g., in dB) may be set by government regulation which may change depending on the carrier or the location in which the wireless device 100 is operating or is sold (i.e., irrespective of the impendence of the headphones 105). Again, as is known to those skilled in the art, the wireless device 100 has means for determining its carrier and/or location and hence the government regulations that may apply to set maximum signal levels and/or maximum sound pressure levels. Thus, according to one embodiment, the microprocessor 138 receives a signal indicative of the carrier and/or location of the wireless device 100 and determines whether a maximum signal level value and/or a maximum sound pressure level value has been prescribed for the carrier and/or location. The microprocessor 138 may do this by accessing a table 206 that stores wireless device carrier (or location), corresponding headphones impedance values, corresponding carrier specific maximum signal level values (if any) for the audio amplifier 430, and/or corresponding carrier specific maximum sound pressure level values (if any) for the headphones 105. For example, the table 206 may indicate that if the wireless device 100 is associated with a carrier based in Great Britain, then the maximum sound pressure level should be restricted to 100 dB (i.e., if the headphones 105 and wireless device 100 are sold as a package). As another example, the table 206 may indicate that if the wireless device 100 is associated with a carrier based in Great Britain, then the maximum sound pressure level should be restricted to 94 dB (i.e., if the headphones 105 and wireless device 100 are not sold as a package).

According to one embodiment, updates to the table 206 storing carrier (or wireless device location), corresponding headphones impedance values, corresponding carrier specific maximum signal level values (if any) for the audio amplifier 430, and corresponding carrier specific maximum sound pressure level values (if any) for the headphones 105 may be periodically downloaded to the wireless device 100 (e.g., over the network 220).

According to one embodiment, the carrier associated with the wireless device 100 may be determined from messages delivered to the wireless device 100 over the network 220.

According to another embodiment, the carrier may be determined from information stored in the wireless device's SIM card 162.

According to one embodiment, the location of the wireless device 100 may be determined from messages delivered to the wireless device 100 over the network 220. According to another embodiment, the location of the wireless device 100 may be determined by a global positioning system ("GPS") receiver (not shown) optionally provided for the device 100. According to another embodiment, the location of the wireless device 100 may be determined from the location of antennae towers associated with the network 220 on which the wireless device 100 operates.

Figure 5:
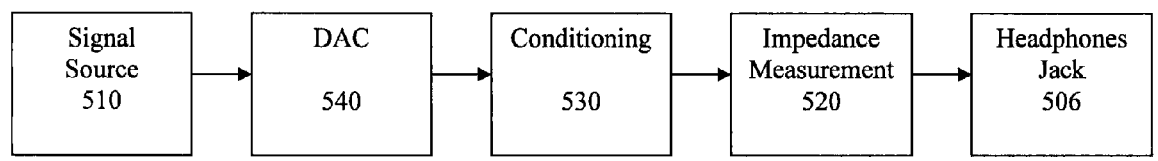
FIG. 5 is a block diagram illustrating an alternate headphones subsystem in accordance with an embodiment of the application; and, FIG. 6 is a flow chart illustrating operations of modules within the memory of a wireless device for controlling maximum signal level output to headphones of the wireless device, in accordance with an embodiment of the application.

FIG. 5 is a block diagram illustrating an alternate headphones subsystem 400 in accordance with an embodiment of the application. In FIG. 5, a signal source 510 (e.g., microprocessor 138) generates a signal (e.g., an audio signal, an inaudible audio signal, etc.) that is applied to a digital to analog converter ("DAC") 540. The output of the DAC 540 is conditioned 530 (e.g., amplified 430, etc.) to allow for impendence measurement 520 (e.g., via a resistor R, etc.) of the headphones 105 connected to the headphones jack 506.

The application may provide several advantages. For example, the method of the present application allows wireless devices 100 to restrict maximum signal levels and maximum sound pressure levels to prescribed legal limits when necessary.

Figure 6:
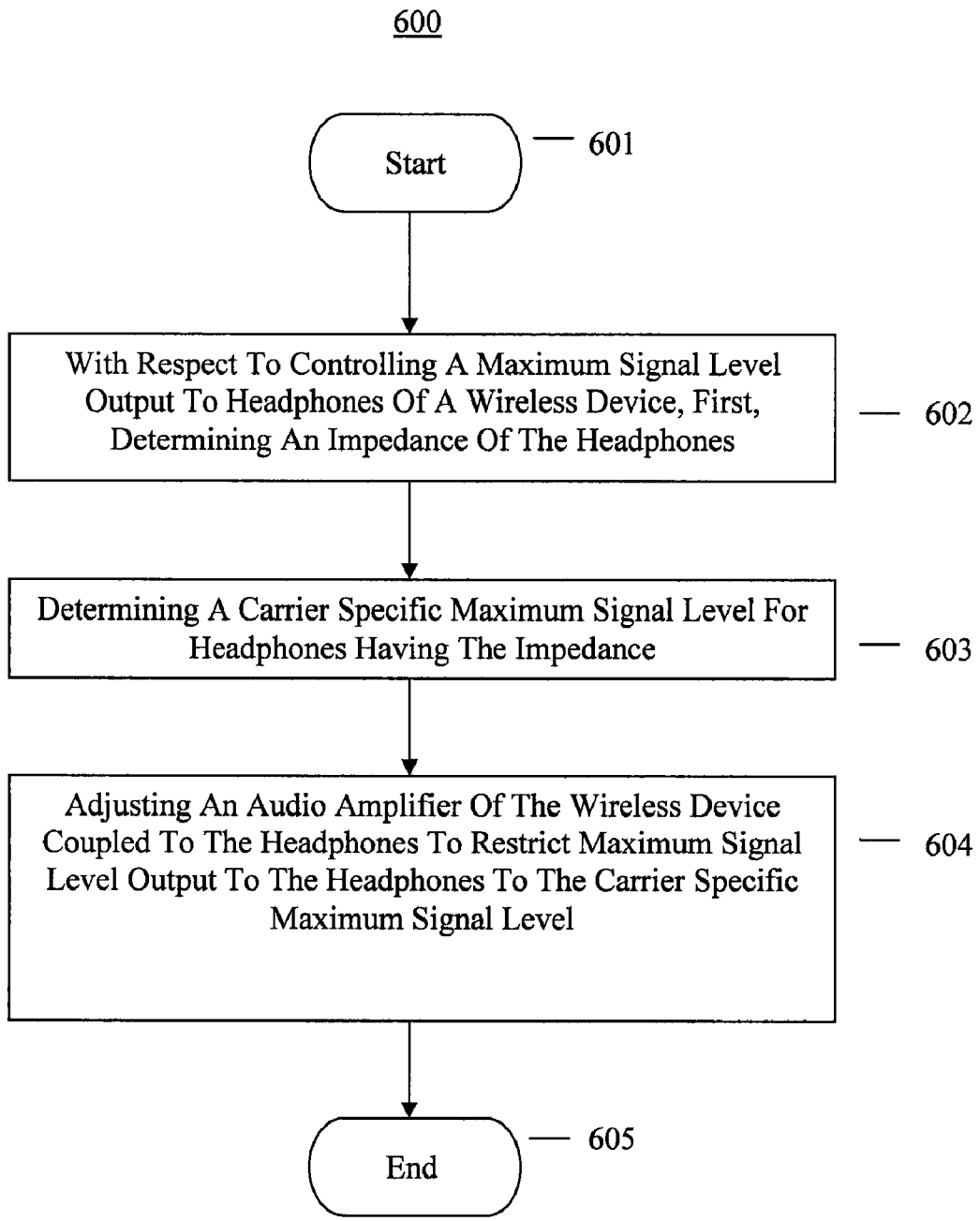

Aspects of the above described method may be illustrated with the aid of a flowchart. FIG. 6 is a flow chart illustrating operations 600 of modules 206 within the memory 200 of a wireless device 210 for controlling maximum signal level output to headphones 105 of the wireless device 100, in accordance with an embodiment of the application.

At step 601, the operations 600 start.

At step 602, an impedance Z of the headphones 105 is determined.

At step 603, a carrier specific maximum signal level for headphones having the impedance Z is determined.

At step 604, an audio amplifier 430 of the wireless device 100 coupled to the headphones 105 is adjusted to restrict the maximum signal level output to the headphones 105 to the carrier specific maximum signal level.

At step 605, the operations 600 end.

The above described method is generally performed by the wireless device 100. However, according to one embodiment, the method can be performed by, or in combination with, a data processing system (not shown) such a personal computer ("PC") or server, a stereo system, a television system, etc.

While embodiments of this application are primarily discussed as a method, a person of ordinary skill in the art will understand that the apparatus discussed above with reference to a wireless device 100 and a data processing system, may be programmed to enable the practice of the method of these embodiments. Moreover, an article of manufacture for use with a wireless device 100 or data processing system, such as a pre-recorded storage device or other similar computer readable medium including program instructions recorded thereon, may direct the wireless device 100 or data processing system to facilitate the practice of the method of these embodiments. It is understood that such apparatus and articles of manufacture also come within the scope of the application.

The embodiments of the application described above are intended to be exemplary only. Those skilled in this art will understand that various modifications of detail may be made to these embodiments, all of which come within the scope of the application.

What is claimed is:

1. A method for controlling a maximum signal level output to headphones of a wireless device, comprising:
    determining an impedance of the headphones;
    determining a carrier specific maximum signal level for headphones having the impedance, wherein the carrier specific maximum signal level is a maximum signal level prescribed for a carrier for the wireless device and for headphones having the impendence; and,
    adjusting an audio amplifier of the wireless device coupled to the headphones to restrict the maximum signal level output to the headphones to the carrier specific maximum signal level.

2. The method of claim 1 wherein the determining of the impedance further comprises applying an audio signal to the headphones.

3. The method of claim 2 wherein the audio signal is an inaudible audio signal.

4. The method of claim 1 and further comprising determining the carrier.

5. The method of claim 1 wherein the determining of the carrier specific maximum signal level further comprises searching a table stored in the wireless device using the impedance and the carrier, the table listing impedances, carriers, and corresponding carrier specific maximum signal levels.

6. The method of claim 4 wherein the carrier is determined from a signal received from a network in which the wireless device is operating.

7. The method of claim 1 wherein the carrier is associated with a location and further comprising determining the location.

8. The method of claim 7 wherein the determining of the carrier specific maximum signal level further comprises searching a table stored in the wireless device using the impedance and the location, the table listing impedances, locations, and corresponding carrier specific maximum signal levels.

9. The method of claim 8 wherein the location is determined from a signal received from a network in which the wireless device is operating.

10. A system within a wireless device for controlling a maximum signal level output to headphones coupled to the wireless device, comprising:
    a processor coupled to memory and configured to:
    determine an impedance of the headphones;
    determine a carrier specific maximum signal level for headphones having the impedance, wherein the carrier specific maximum signal level is a maximum signal level prescribed for a carrier for the wireless device and for headphones having the impendence; and,
    adjust an audio amplifier of the wireless device coupled to the headphones to restrict the maximum signal level output to the headphones to the carrier specific maximum signal level.

11. The system of claim 10 wherein, to determine the impedance, the processor is further configured to apply an audio signal to the headphones.

12. The system of claim 11 wherein the audio signal is an inaudible audio signal.

13. The system of claim 10 wherein the processor is further configured to determine the carrier.

14. The system of claim 10 wherein, to determine the carrier specific maximum signal level, the processor is further configured to search a table stored in the wireless device using the impedance and the carrier, the table listing impedances, carriers, and corresponding carrier specific maximum signal levels.

15. The system of claim 13 wherein the carrier is determined by the processor from a signal received from a network in which the wireless device is operating.

16. The system of claim 10 wherein the carrier is associated with a location and wherein the processor is further configured to determine the location.

17. The system of claim 16 wherein, to determine the carrier specific maximum signal level, the processor is further configured to search a table stored in the wireless device using the impedance and the location, the table listing impedances, locations, and corresponding carrier specific maximum signal levels.

18. The system of claim 17 wherein the location is determined by the processor from a signal received from a network in which the wireless device is operating.

* * * * *